United States Patent
Yagev et al.

(10) Patent No.: US 10,043,097 B2
(45) Date of Patent: Aug. 7, 2018

(54) IMAGE ABSTRACTION SYSTEM

(71) Applicant: FRINGEFY LTD., Tel Aviv (IL)

(72) Inventors: Stav Yagev, Tel Aviv (IL); Omer Meir, Tel Aviv (IL); Eitan Sharon, Palo Alto, CA (US); Achi Brandt, San Mateo, CA (US); Assif Ziv, Bet Yitzhak (IL)

(73) Assignee: Fringefy LTD., Tel Aviv (IL)

( * ) Notice: Subject to any disclaimer, the term of this patent is extended or adjusted under 35 U.S.C. 154(b) by 176 days.

(21) Appl. No.: 15/066,444

(22) Filed: Mar. 10, 2016

(65) Prior Publication Data

US 2016/0267326 A1 Sep. 15, 2016

Related U.S. Application Data

(60) Provisional application No. 62/131,177, filed on Mar. 10, 2015.

(51) Int. Cl.
  *G06K 9/00* (2006.01)
  *G06K 9/46* (2006.01)
  *G06T 19/00* (2011.01)

(52) U.S. Cl.
  CPC ......... *G06K 9/4647* (2013.01); *G06K 9/0063* (2013.01); *G06K 9/00704* (2013.01); *G06T 19/006* (2013.01); *G06K 2209/40* (2013.01)

(58) Field of Classification Search
  CPC . G06K 9/0063; G06K 2209/40; G06T 19/006
  See application file for complete search history.

(56) References Cited

U.S. PATENT DOCUMENTS

| | | |
|---|---|---|
| 6,711,293 B1 | 3/2004 | Lowe |
| 7,903,899 B2 | 3/2011 | Sharon et al. |
| 7,920,748 B2 | 4/2011 | Sharon et al. |
| 2012/0321175 A1 | 12/2012 | Hedau et al. |

OTHER PUBLICATIONS

O'Hanlon, Kenneth. "Building Recognition using Computer Vision." 2005.*
M. Kushnir and I. Shimshoni, "Epipolar Geometry Estimation for Urban Scenes with Repetitive Structures," in IEEE Transactions on Pattern Analysis and Machine Intelligence, vol. 36, No. 12, pp. 2381-2395, Dec. 1, 2014.*

(Continued)

*Primary Examiner* — Utpal Shah
(74) *Attorney, Agent, or Firm* — Mark E. Ungerman; Ungerman IP PLLC

(57) ABSTRACT

An image abstraction engine is provided to characterize scenes like typically found in an urban setting. Specifically buildings and manmade structures have certain characteristic properties that may be abstracted and compressed in a manner that takes advantage of those characteristic properties. This allows for a more compact and computationally efficient abstraction and recognition.

15 Claims, 10 Drawing Sheets

(56) References Cited

OTHER PUBLICATIONS

Blaschke, T., Hay, G., Kelly, M., Lang, S., Hofmann, P., Addink, E., Feitosa, R.Q., Van Der Meer, F., Van Der Werff, H., Van Coillie, F. & Tiede, D., Geographic Object-Based Image Analysis—Towards a new paradigm. (Jul. 12, 2012). Department of Geoinformatics—Z_GIS, University of Salzburg, Salzburg, Austria. ISPRS Journal of Photogrammetry and Remote Sensing. Jan. 2014, 87, pp. 180-191. Retrieved Feb. 23, 2015, from http://www.ncbi.nlm.nih.gov/pmc/articles/PMC3945831/?report=printable, Elsevier B.V.
Chen, Z., Lam, O., Jacobson, A. & Milford, M., Convolutional Neural Network-based Place Recognition. (2014). ARC Centre of Excellence for Robotic Vision, Queensland University of Technology, Queensland, Austria. arXiv preprint arXiv:1411.1509.
Computer vision. Retrieved Feb. 23, 2015, from https://en.wikipedia.org/wiki/Computer_vision.
Geographic information system. Retrieved Feb. 23, 2015, from https://en.wikipedia.org/wiki/Geographic_information_system.
GIS applications. Retrieved Feb. 23, 2015, from https://en.wikipedia.org/wiki/GIS_applications.
Image analysis. Retrieved Feb. 23, 2015, from https://en.wikipedia.org/wiki/Image_analysis.
Image processing. Retrieved Feb. 23, 2015, from https://en.wikipedia.org/wiki/Image_processing.

\* cited by examiner

IMAGE ABSTRACTION SYSTEM

BACKGROUND OF THE INVENTION

1. Field of the Invention

The invention relates to image abstraction and particularly to image abstraction useful for images of the type found in urban areas.

2. Description of the Related Technology

Computer vision is a field that includes methods for acquiring, processing, analyzing, and understanding images and, in general, high-dimensional data from the real world in order to produce numerical or symbolic information, e.g., in the forms of decisions. A theme in the development of this field has been to duplicate the abilities of human vision by electronically perceiving and understanding an image. This image understanding can be seen as the disentangling of symbolic information from image data using models constructed with the aid of geometry, physics, statistics, and learning theory. Computer vision has also been described as the enterprise of automating and integrating a wide range of processes and representations for vision perception.

As a scientific discipline, computer vision is concerned with the theory behind artificial systems that extract information from images. The image data can take many forms, such as video sequences, views from multiple cameras, or multi-dimensional data from a medical scanner. As a technological discipline, computer vision seeks to apply its theories and models to the construction of computer vision systems.

Sub-domains of computer vision include scene reconstruction, event detection, video tracking, object recognition, object pose estimation, learning, indexing, motion estimation, and image restoration.

In imaging science, image processing is any form of signal processing for which the input is an image, such as a photograph or video frame; the output of image processing may be either an image or a set of characteristics or parameters related to the image. Most image-processing techniques involve treating the image as a two-dimensional signal and applying standard signal-processing techniques to it.

Image processing usually refers to digital image processing, but optical and analog image processing also are possible. The acquisition of images (producing the data representative of an image in the first place) is referred to as imaging.

Closely related to image processing are computer graphics and computer vision. In computer graphics, images are manually made from physical models of objects, environments, and lighting, instead of being acquired (via imaging devices such as cameras) from natural scenes, as in most animated movies. Computer vision, on the other hand, is often considered high-level image processing out of which a machine/computer/software intends to decipher the physical contents of an image or a sequence of images (e.g., videos or 3D full-body magnetic resonance scans).

In modern sciences and technologies, images also gain much broader scopes due to the ever growing importance of scientific visualization (of often large-scale complex scientific/experimental data). Examples include microarray data in genetic research, or real-time multi-asset portfolio trading in finance.

Image analysis is the extraction of meaningful information from images; mainly from digital images by means of digital image processing techniques. Image analysis tasks can be as simple as reading bar coded tags or as sophisticated as identifying a person from their face.

Computers are indispensable for the analysis of large amounts of data, for tasks that require complex computation, or for the extraction of quantitative information. On the other hand, the human visual cortex is an excellent image analysis apparatus, especially for extracting higher-level information, and for many applications, including medicine, security, and remote sensing, human analysts still cannot be replaced by computers. For this reason, many important image analysis tools such as edge detectors and neural networks are inspired by human visual perception models.

Computer Image Analysis makes heavy use of pattern recognition, digital geometry, and signal processing.

It is the quantitative or qualitative characterization of two-dimensional (2D) or three-dimensional (3D) digital images. 2D images are, for example, to be analyzed in computer vision, and 3D images in medical imaging.

There are many different techniques used in automatically analyzing images. Each technique may be useful for a small range of tasks, however there still aren't any known methods of image analysis that are generic enough for wide ranges of tasks, compared to the abilities of a human's image analyzing capabilities. Examples of image analysis techniques in different fields include:

2D and 3D object recognition,
image segmentation,
motion detection e.g. Single particle tracking,
video tracking,
optical flow,
medical scan analysis,
3D Pose Estimation,
automatic number plate recognition.

Digital Image Analysis is when a computer or electrical device automatically studies an image to obtain useful information from it. Note that the device is often a computer but may also be an electrical circuit, a digital camera or a mobile phone. The applications of digital image analysis are continuously expanding through all areas of science and industry, including:

medicine, such as detecting cancer in an MRI scan
microscopy, such as counting the germs in a swab
remote sensing, such as detecting intruders in a house, and producing land cover/land use maps
astronomy, such as calculating the size of a planet
materials science, such as determining if a metal weld has cracks
machine vision, such as to automatically count items in a factory conveyor belt
security, such as detecting a person's eye color or hair color
robotics, such as to avoid steering into an obstacle
optical character recognition, such as automatic license plate detection
assay micro plate reading, such as detecting where a chemical was manufactured
metallography, such as determining the mineral content of a rock sample
defense
filtering Object-Based Image Analysis (OBIA)—also Geographic Object-Based Image Analysis (GEOBIA)—"is a sub-discipline of geoinformation science devoted to partitioning remote sensing (RS) imagery into meaningful image-objects, and assessing their characteristics through spatial, spectral and temporal scale".

The two main processes in OBIA are (1) segmentation and (2) classification. Traditional image segmentation is on a per-pixel basis. However, OBIA groups pixels into homogeneous objects. These objects can have different shapes and scale. Objects also have statistics associated with them which can be used to classify objects. Statistics can include geometry, context and texture of image objects.

A geographic information system (GIS) is a system designed to capture, store, manipulate, analyze, manage, and present spatial or geographical data. The acronym GIS is sometimes used for geographical information science or geospatial information studies to refer to the academic discipline or career of working with geographic information systems and is a large domain within the broader academic discipline of Geoinformatics.

In a general sense, the term describes any information system that integrates, stores, edits, analyzes, shares, and displays geographic information. GIS applications are tools that allow users to create interactive queries (user-created searches), analyze spatial information, edit data in maps, and present the results of all these operations. Geographic information science is the science underlying geographic concepts, applications, and systems.

GIS has many applications related to engineering, planning, management, transport/logistics, insurance, telecommunications, and business. For that reason, GIS and location intelligence applications can be the foundation for many location-enabled services that rely on analysis and visualization.

GIS can relate unrelated information by using location as the key index variable. Locations or extents in the Earth space-time may be recorded as dates/times of occurrence, and x, y, and z coordinates representing, longitude, latitude, and elevation, respectively. All Earth-based spatial-temporal location and extent references should, ideally, be relatable to one another and ultimately to a "real" physical location or extent. This key characteristic of GIS has begun to open new avenues of scientific inquiry.

Modern GIS technologies use digital information, for which various digitized data creation methods are used. The most common method of data creation is digitization, where a hard copy map or survey plan is transferred into a digital medium through the use of a CAD program, and georeferencing capabilities. With the wide availability of orthorectified imagery (both from satellite and aerial sources), heads-up digitizing is becoming the main avenue through which geographic data is extracted. Heads-up digitizing involves the tracing of geographic data directly on top of the aerial imagery instead of by the traditional method of tracing the geographic form on a separate digitizing tablet (heads-down digitizing).

GIS uses spatio-temporal (space-time) location as the key index variable for all other information. Just as a relational database containing text or numbers can relate many different tables using common key index variables, GIS can relate otherwise unrelated information by using location as the key index variable. The key is the location and/or extent in space-time.

Any variable that can be located spatially, and increasingly also temporally, can be referenced using a GIS. Locations or extents in Earth space-time may be recorded as dates/times of occurrence, and x, y, and z coordinates representing, longitude, latitude, and elevation, respectively. These GIS coordinates may represent other quantified systems of temporo-spatial reference (for example, film frame number, stream gage station, highway mile-marker, surveyor benchmark, building address, street intersection, entrance gate, water depth sounding, POS or CAD drawing origin/units). Units applied to recorded temporal-spatial data can vary widely (even when using exactly the same data, see map projections), but all Earth-based spatial-temporal location and extent references should, ideally, be relatable to one another and ultimately to a "real" physical location or extent in space-time.

Related by accurate spatial information, an incredible variety of real-world and projected past or future data can be analyzed, interpreted and represented.

GIS accuracy depends upon source data, and how it is encoded to be data referenced. Land surveyors have been able to provide a high level of positional accuracy utilizing the GPS-derived positions. High-resolution digital terrain and aerial imagery, powerful computers and Web technology are changing the quality, utility, and expectations of GIS to serve society on a grand scale, but nevertheless there are other source data that have an impact on overall GIS accuracy like paper maps, though these may be of limited use in achieving the desired accuracy since the aging of maps affects their dimensional stability.

The scale of a map and geographical rendering area representation type are very important aspects since the information content depends mainly on the scale set and resulting locatability of the map's representations. In order to digitize a map, the map has to be checked within theoretical dimensions, then scanned into a raster format, and resulting raster data has to be given a theoretical dimension by a rubber sheeting/warping technology process.

A quantitative analysis of maps brings accuracy issues into focus. The electronic and other equipment used to make measurements for GIS is far more precise than the machines of conventional map analysis. All geographical data are inherently inaccurate, and these inaccuracies will propagate through GIS operations in ways that are difficult to predict.

GIS data represents real objects (such as roads, land use, elevation, trees, waterways, etc.) with digital data determining the mix. Real objects can be divided into two abstractions: discrete objects (e.g., a house) and continuous fields (such as rainfall amount, or elevations). Traditionally, there are two broad methods used to store data in a GIS for both kinds of abstractions mapping references: raster images and vector. Points, lines, and polygons are the stuff of mapped location attribute references. A new hybrid method of storing data is that of identifying point clouds, which combine three-dimensional points with RGB information at each point, returning a "3D color image". GIS thematic maps then are becoming more and more realistically visually descriptive of what they set out to show or determine.

Example of hardware for mapping (GPS and laser rangefinder) and data collection (rugged computer). The current trend for geographical information system (GIS) is that accurate mapping and data analysis are completed while in the field. Depicted hardware (field-map technology) is used mainly for forest inventories, monitoring and mapping.

Data capture—entering information into the system—consumes much of the time of GIS practitioners. There are a variety of methods used to enter data into a GIS where it is stored in a digital format.

Existing data printed on paper or PET film maps can be digitized or scanned to produce digital data. A digitizer produces vector data as an operator traces points, lines, and polygon boundaries from a map. Scanning a map results in raster data that could be further processed to produce vector data.

Survey data can be directly entered into a GIS from digital data collection systems on survey instruments using a technique called coordinate geometry (COGO). Positions from a global navigation satellite system (GNSS) like Global Positioning System can also be collected and then imported into a GIS. A current trend in data collection gives users the ability to utilize field computers with the ability to edit live data using wireless connections or disconnected editing sessions. This has been enhanced by the availability of low-cost mapping-grade GPS units with decimeter accuracy in real time. This eliminates the need to post process, import, and update the data in the office after fieldwork has been collected. This includes the ability to incorporate positions collected using a laser rangefinder. New technologies also allow users to create maps as well as analysis directly in the field, making projects more efficient and mapping more accurate.

Remotely sensed data also plays an important role in data collection and consist of sensors attached to a platform. Sensors include cameras, digital scanners and LIDAR, while platforms may consist of aircraft and satellites. With the development of miniature UAVs, aerial data collection is becoming possible at much lower costs, and on a more frequent basis. For example, the Aeryon Scout was used to map a 50-acre area with a Ground sample distance of 1 inch (2.54 cm) in only 12 minutes.

The majority of digital data currently comes from photo interpretation of aerial photographs. Soft-copy workstations are used to digitize features directly from stereo pairs of digital photographs. These systems allow data to be captured in two and three dimensions, with elevations measured directly from a stereo pair using principles of photogrammetry. Analog aerial photos must be scanned before being entered into a soft-copy system, for high-quality digital cameras this step is skipped.

Satellite remote sensing provides another important source of spatial data. Here satellites use different sensor packages to passively measure the reflectance from parts of the electromagnetic spectrum or radio waves that were sent out from an active sensor such as radar. Remote sensing collects raster data that can be further processed using different bands to identify objects and classes of interest, such as land cover.

When data is captured, the user should consider if the data should be captured with either a relative accuracy or absolute accuracy, since this could not only influence how information will be interpreted but also the cost of data capture.

After entering data into a GIS, the data usually requires editing, to remove errors, or further processing. For vector data it must be made "topologically correct" before it can be used for some advanced analysis. For example, in a road network, lines must connect with nodes at an intersection. Errors such as undershoots and overshoots must also be removed. For scanned maps, blemishes on the source map may need to be removed from the resulting raster. For example, a fleck of dirt might connect two lines that should not be connected.

Data restructuring can be performed by a GIS to convert data into different formats. For example, a GIS may be used to convert a satellite image map to a vector structure by generating lines around all cells with the same classification, while determining the cell spatial relationships, such as adjacency or inclusion.

More advanced data processing can occur with image processing, a technique developed in the late 1960s by NASA and the private sector to provide contrast enhancement, false color rendering and a variety of other techniques including use of two dimensional Fourier transforms. Since digital data is collected and stored in various ways, the two data sources may not be entirely compatible. So a GIS must be able to convert geographic data from one structure to another. In so doing, the implicit assumptions behind different ontologies and classifications require analysis. Object ontologies have gained increasing prominence as a consequence of object-oriented programming and sustained work by Barry Smith and co-workers.

The earth can be represented by various models, each of which may provide a different set of coordinates (e.g., latitude, longitude, elevation) for any given point on the Earth's surface. The simplest model is to assume the earth is a perfect sphere. As more measurements of the earth have accumulated, the models of the earth have become more sophisticated and more accurate. In fact, there are models called datums that apply to different areas of the earth to provide increased accuracy, like NAD83 for U.S. measurements, and the World Geodetic System for worldwide measurements.

Spatial analysis with geographical information system (GIS) GIS spatial analysis is a rapidly changing field, and GIS packages are increasingly including analytical tools as standard built-in facilities, as optional toolsets, as add-ins or 'analysts'. In many instances these are provided by the original software suppliers (commercial vendors or collaborative non-commercial development teams), whilst in other cases facilities have been developed and are provided by third parties. Furthermore, many products offer software development kits (SDKs), programming languages and language support, scripting facilities and/or special interfaces for developing one's own analytical tools or variants. The increased availability has created a new dimension to business intelligence termed "spatial intelligence" which, when openly delivered via intranet, democratizes access to geographic and social network data. Geospatial intelligence, based on GIS spatial analysis, has also become a key element for security. GIS as a whole can be described as conversion to a vectorial representation or to any other digitization process.

OpenCV (Open Source Computer Vision) is a library of programming functions mainly aimed at real-time computer vision. It is free for use under the open-source BSD license. The library is cross-platform. It focuses mainly on real-time image processing. The library has more than 2500 optimized algorithms, which includes a comprehensive set of both classic and state-of-the-art computer vision and machine learning algorithms. These algorithms can be used to detect and recognize faces, identify objects, classify human actions in videos, track camera movements, track moving objects, extract 3D models of objects, produce 3D point clouds from stereo cameras, stitch images together to produce a high resolution image of an entire scene, find similar images from an image database, remove red eyes from images taken using flash, follow eye movements, recognize scenery and establish markers to overlay it with augmented reality, etc. OpenCV has more than 47 thousand people of user community and estimated number of downloads exceeding 7 million. The library is used extensively in companies, research groups and by governmental bodies. The library is available at www.opencv.org.

Conventional "visual search" products (e.g. Google Goggles, CamFind, Cortica.com, etc.) do not attack the specific problem of place recognition. Homesnap, www.homesnap.com recognizes real estate using non-visual sensors. US 20120321175 A1 shows a mobile device for performing real-time location recognition with assistance from a server. The approximate geophysical location of the mobile device is uploaded to the server. Based on the mobile device's approximate geophysical location, the server responds by sending the mobile device a message comprising a classifier and a set of feature descriptors. This can occur before an image is captured for visual querying. The classifier and feature descriptors are computed during an offline training stage using techniques to minimize computation at query time. Chen, Zetao, et al. "Convolutional Neural Network-based Place Recognition." arXiv preprint arXiv:1411.1509 (2014), the disclosure of which is expressly incorporated herein, proposes to use Convolutional Neural Networks (CNNs) for place recognition technique based on CNN models, by combining features learned by CNNs with a spatial and sequential filter.

SUMMARY OF THE INVENTION

It is an object of the invention to facilitate the use of an image of a location to search for an identification of the location.

Some existing technologies use non-visual sensors (e.g. GPS, magnetic sensors, accelerometers) to tackle the problem ascertaining location. An object of the invention is to provide a system with enhanced accuracy and success at recovering the intent of the user in seeking information about a point of interest. It is an object of the invention to enhance accuracy, scalability, and runtime performance of place recognition using visual data.

It is an object to provide a system for abstracting images and a system for image recognition. Particularly a system for abstracting images may be used in a system suitable for indexing and/or identifying points of interest. In a possible application, a user could capture an image of a landmark, building or other point of interest. The invention is intended to overcome challenges in recognizing images of such locations. The challenges include reliable identification of a point of interest under significant occlusion and from a range of viewpoints, image sizes, resolution and ambient conditions. An image of a point of interest may be taken from many angles and distances and with varying degrees of magnification. It is intended that all such images of a particular point of interest be recognized as being the same object. For example an image of a point of interest might be captured from any height accessible by a user's mobile communication device and may be from any direction, possibly up to 360 degrees. The image may be captured from a broad range of distances from the object. Another challenge to image recognition is lighting variations, weather variations, seasonal variations, and objects that may occlude a portion of a landmark (such as trees, pedestrians, cars, etc.) of which will affect the captured image. It is an object of the invention to consistently be able to identify a location on the basis of all of these variations in the captured image.

Traditional raster features are not robust enough to overcome the challenges attendant to variations in the outdoor scene. Conventional patch descriptors that describe an encapsulated point require too much time and computational resources for near real-time location recognition in a personal computing device. Outdoor scenes typically require hundreds of point features which make traditional recognition processes impractical in view of the computational performance and communication bandwidth which would otherwise be required. It is one object of the invention to facilitate abstraction, indexing and/or recognition of images and to take advantage of characteristics frequently present in images of locations of interest.

A system according to the invention provides enhanced abilities particularly applicable to images of building and manmade structures. Images of these objects often include straight lines/line segments and orthogonal elements. Traditional image analysis and abstraction would require bandwidth and computational resources that make useful abstraction and identification with a mobile device, such as current conventional smartphones, camera phones, tablets and PDAs, impractical.

According to a feature of the invention, a captured scene may be abstracted in a fashion intended to take advantage of characteristic geometry and structure. One process for characterizing an image is to use rectification to compensate for aspect variations. This may be accomplished by identifying and applying a transformation of an image into a representation of a fronto-parallel view. It has been found that urban scenes such as of buildings exhibit distinct line statistics. The lines and statistics can be mapped and analyzed to segment an urban scene.

In many manmade structures there are sufficient physical horizontal or vertical lines that are represented as converging in the image, under any transformation of aspect. Those that converge would, if extended, reach a common point called a vanishing point. Knowing the convergence point permits derivation of a reverse perspective transformation and the line statistics also permit a part of an image which is relevant for the identification—i.e. which includes the structure of interest and not the sky, floor, neighboring structures, etc. to be cropped out.

According to a feature of the invention, the effects of line changes and occlusions can be accounted for by extracting features along horizontal and vertical lines in order to ensure emphasis on the "urban" characteristics. An occlusion may be caused by an object blocking some or all of an element in an image.

The image processing can use various processing techniques including Intensity responses, Gradient densities, hue response and angle effects in order to take advantage of the orthogonal line segment characteristic in buildings and points of interest by extracting features along horizontal and vertical lines of the rectified image. The image processing can use non-maxima suppression and recognize complimentary orientations—vertical and horizontal.

The non-maxima suppressed intensity, gradient density and hue/angle effects responses can be combined into an abstraction of the image. The abstraction for each point of interest may be indexed in a database. The abstraction determined by the image capture and processing may also be used as the basis for a database query to find an entry close enough to be considered a match.

According to an advantageous feature of the invention, the results may be verified by issuing multiple abstraction queries. The verification may be simplified by using a confined raster comparison. The queries may take advantage of hysteresis by using a video input rather than a single still image. In view of the computational power, the system can confine verification to small portions of an image that are particularly suited to conventional comparisons. Abstractions may be compared simply by comparing matching entries in the abstractions for a score. The match scores between abstractions is the number of entries of the abstraction which were matched or sufficient levels.

An image abstraction engine may be composed of an image rectification unit. The image, either for a reference or for identification may be provided as an input to the image rectification system. The rectification system processes the image to transform it into a fronto-parallel rendition. This may be accomplished based on parallel line segments of the imaged object. This rectification depends on a dominant or predominant characteristic of man-made structures/points of interest being the presence of parallel line segments. The rectification unit may have a line detection unit connected to the input for receiving the input image and a transformation unit responsive to the line detection unit that transforms the image into the fronto-parallel rendition of at least a segment of the input image. The input image may be segmented before or after transformation. A segmentation unit may be connected to the input for receiving an input image and having an output representing a segment of the input image corresponding to a detected area of interest in the input image.

An extraction unit may be responsive to an output of the image rectification unit where an output of the extraction unit is the characterization of one or more image parameters and where the one or more image parameters are related to significant features present in an urban scene. The image abstraction engine may have a compression unit having an input connected to the output of the extraction unit and a compression unit output of compressed image parameters. The compression unit may perform non-maxima suppression. The image parameters may include intensity response, gradient density, dominating hue, or other parameters applicable to an urban setting. The parameters may be extracted using horizontal and/or vertical scans of lines or bands. The extraction may advantageously be a multiple scan abstraction to account for variations in scale/density/distance of the image from the object imaged with respect to a reference scan. Alternatively or additionally the reference may include multiple scale references.

The system may be connected to a database containing reference image extractions and a scoring unit connected to the database and to an output of the image abstraction engine. The database may be stored in a mobile device. In order to alleviate storage and processing constraints in a mobile device, the database and the scoring may be located on a server and cached to the device according to the location. The scoring unit may be based on RANSAC scoring, cosine similarity or any other common feature matching scheme.

An image selection unit may provide one or more images captured by a video camera to the image rectification unit input and a score verification unit connected to the scoring unit to compare scores corresponding to the one or more images captured by a video camera. The image selection unit may provide one or more confined segments of the input image.

The functions described herein may advantageously be performed on a computer system implementing OpenCV or another computer vision library of software solution.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It must be noted that as used herein and in the appended claims, the singular forms "a", "an", and "the" include plural referents unless the context clearly dictates otherwise.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

Depending on context image as used herein, maybe an optical counterpart of an object or scene or a digital representation of an optical counter of an image or scene.

Figure 1:
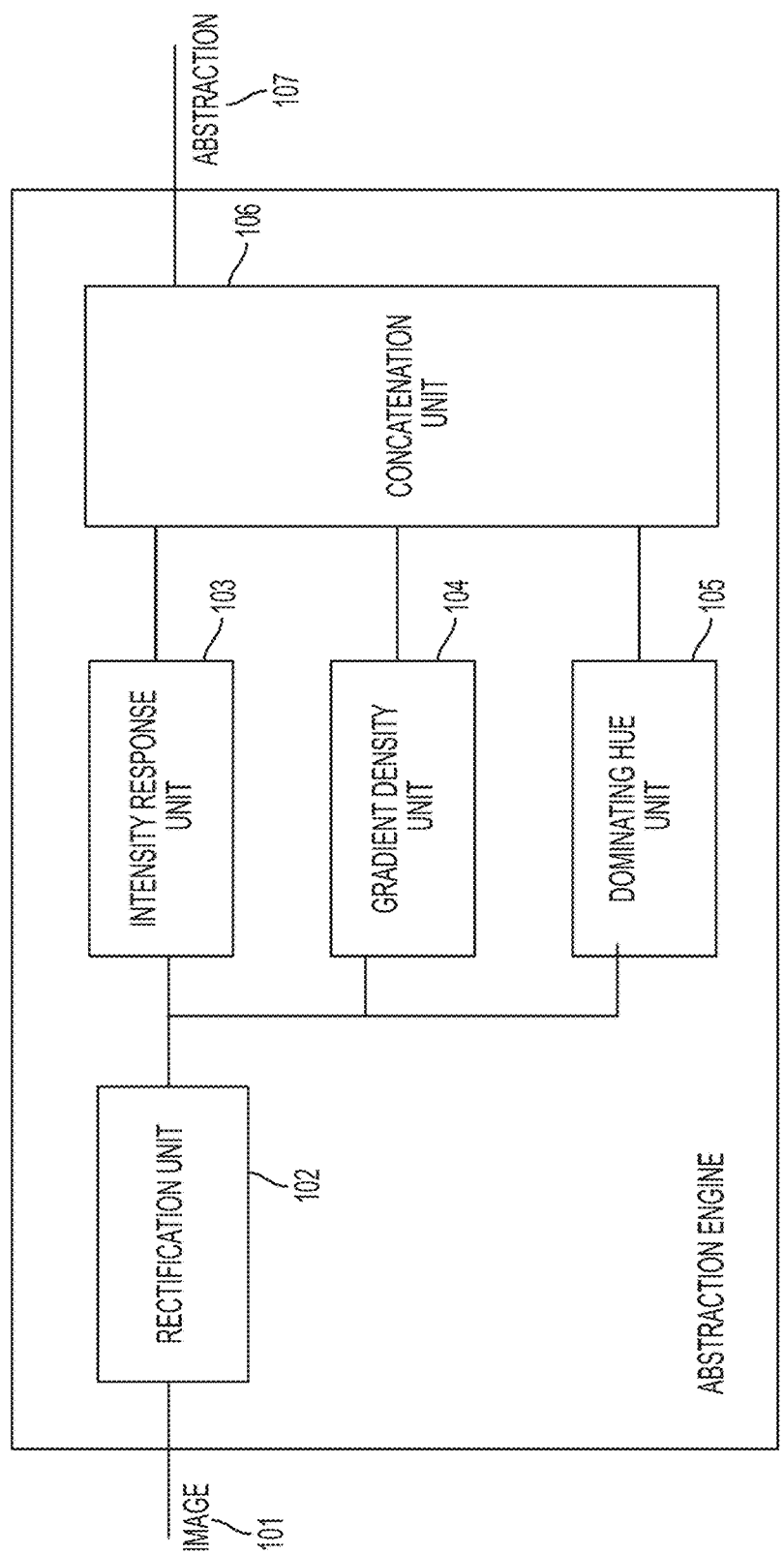
FIG. 1 shows a schematic illustration of an abstraction engine according to an embodiment.

FIG. 1 shows a schematic of an embodiment of an abstraction engine. An input image 101 may be a digital representation of an image. The input image 101 may be provided to a rectification unit 102. The rectification unit is provided to segment an image and transform the segments into fronto-parallel representations of points of interest.

According to an embodiment the rectification unit can detect segments by a unifying characteristic. A brick building in an image may be separated from a concrete building by color and line continuity. Both may be segmented from a background.

Figure 2:
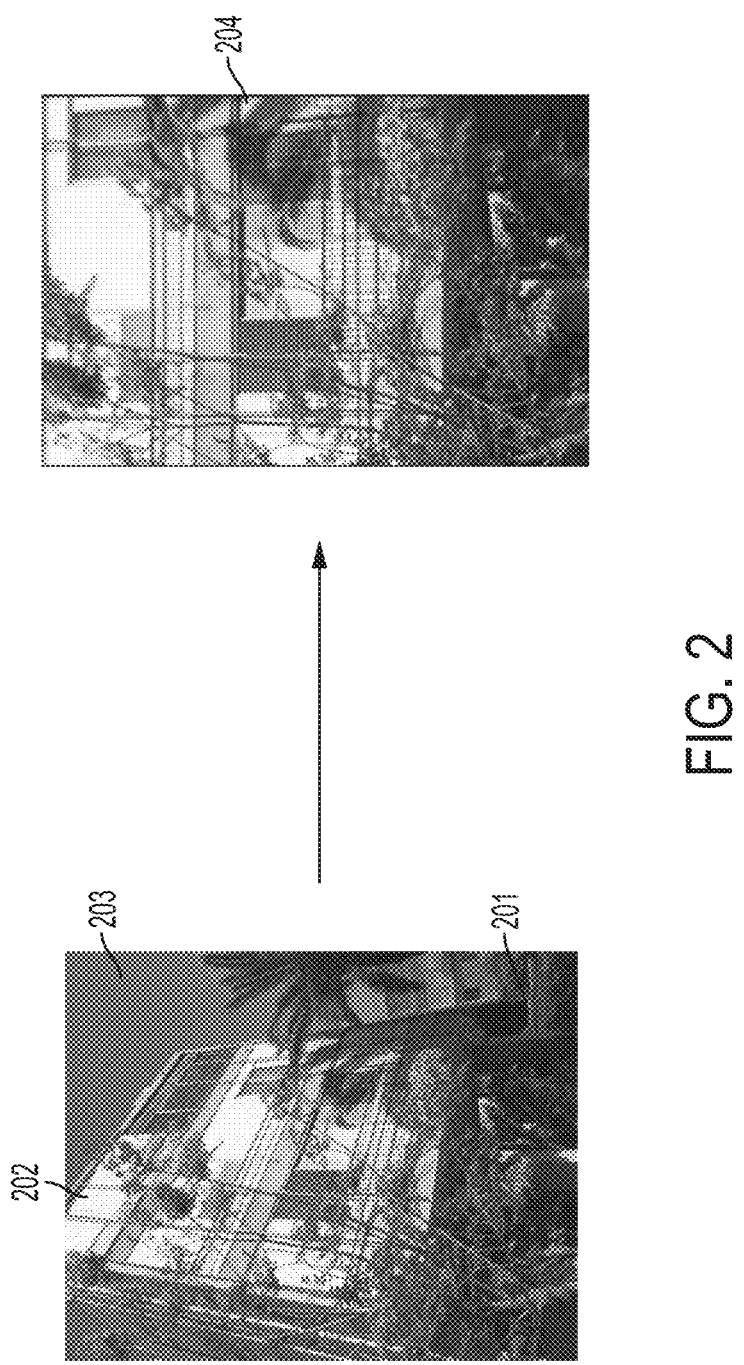
FIG. 2 shows an illustration of an embodiment of a rectification unit.

FIG. 2 illustrates the segmentation and transformation. Image 201 as captured is an image of a point of interest 202 in this case, a building. The image 201 is captured from a point of view that is low and to the left of the building 202. The captured image 201 includes a portion of the front of the building 202 and includes some background 203.

The rectification unit 102 examines the image 201, segments the image 201 into one or more points of interest 202. For each identified point of interest the background 203 may be cropped away.

The image or image segments may be transformed into fronto-parallel representations. The rectification unit 102 may use line segment detection to identify long straight lines. Those lines may be evaluated using consensus search to ascertain vanishing points in single-view geometry present in the captured image. The detected line segments and vanishing points may be utilized to define a transformation to warp an image 201 to a pseudo-fronto-parallel view 204. This aspect rectification is particularly useful for assisting in identification of buildings in images captured away from a perpendicular frontal view by standardizing the perspective and point of view of an image. This process takes advantage of orthogonal line segments common in buildings and other points of interest which exhibit distinct line statistics. The lines and statistics that characterize pseudo-orthogonal objects of the type common in urban areas. The image may, on the basis of line statistics, contain more than one point of interest (POI). Image segments corresponding to each POI so identified may be extracted and processed separately.

According to a feature of the invention, the effects of line changes and occlusions can be accounted for by extracting features along horizontal and vertical lines or bands in order to ensure emphasis on the "urban" characteristics. The image processing may characterize intensity responses, multi-scale gradient densities, hue response, and angle effects. The image processing can use specifically-tailored non-maxima suppression and recognize complimentary orientations—vertical and horizontal.

As shown in FIG. 1, the output of Rectification Unit 102 is provided to an intensity response unit 103, a gradient density unit 104, and a dominating hue 105 each for generating a characterization of an image received from the rectification unit 102.

The characterizations may be provided to a concatenation unit 106. The concatenation unit 106 combines the characterizations to generate an abstraction 107 as an output of concatenation unit 106.

Figure 3:
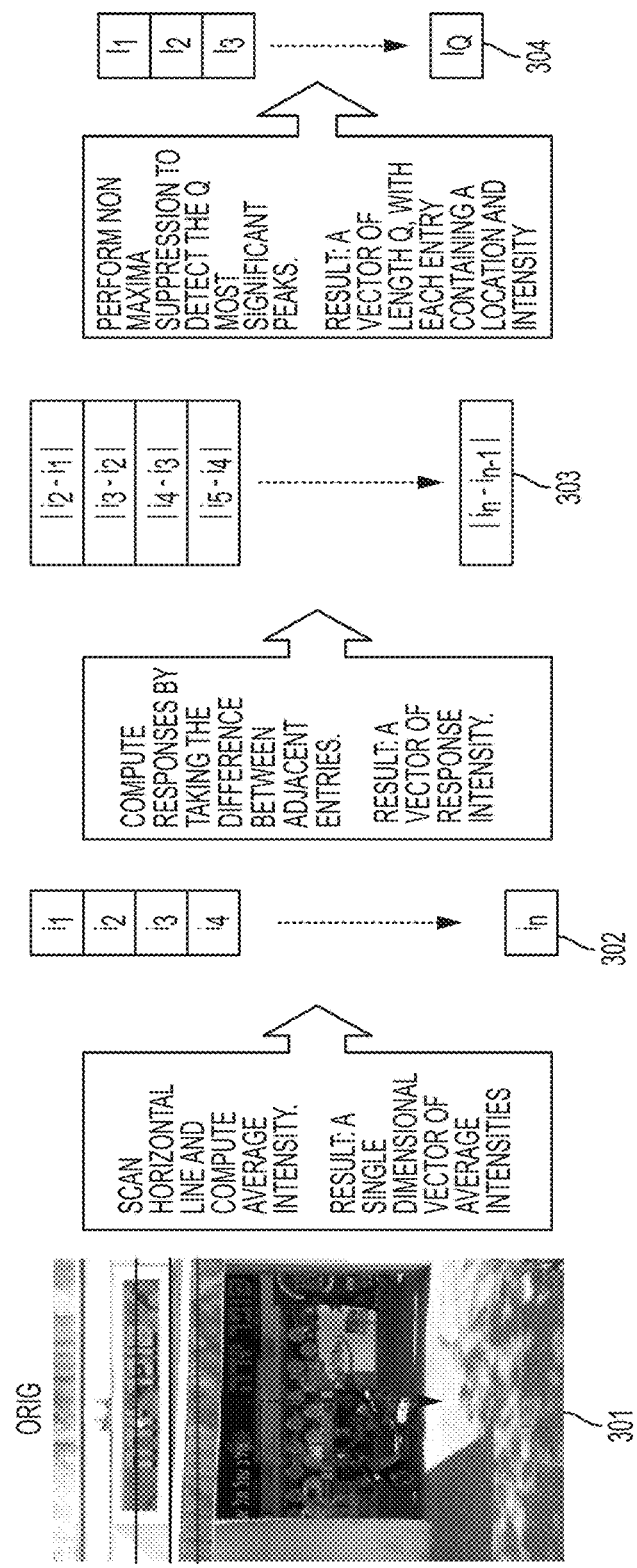
FIG. 3 shows the operation of the intensity response unit.

FIG. 3 shows the operation of an embodiment of the intensity response unit 103. First, a scan of the horizontal lines in a rectified image 301 may be performed and the average intensity for each horizontal line is computed.

The result is a single-dimensional vector 302 of average intensities across the horizontal scan. The intensity response may be determined by computing the differences between adjacent entries in the vector 303 to obtain a second single-dimensional vector 303 representing response intensities. Next, a non-maxima suppression may be utilized to detect the Q most significant peaks. In this fashion a vector 303 of length Q may be obtained with each element containing the location and intensity of the Q most significant intensity peaks.

Figure 4:
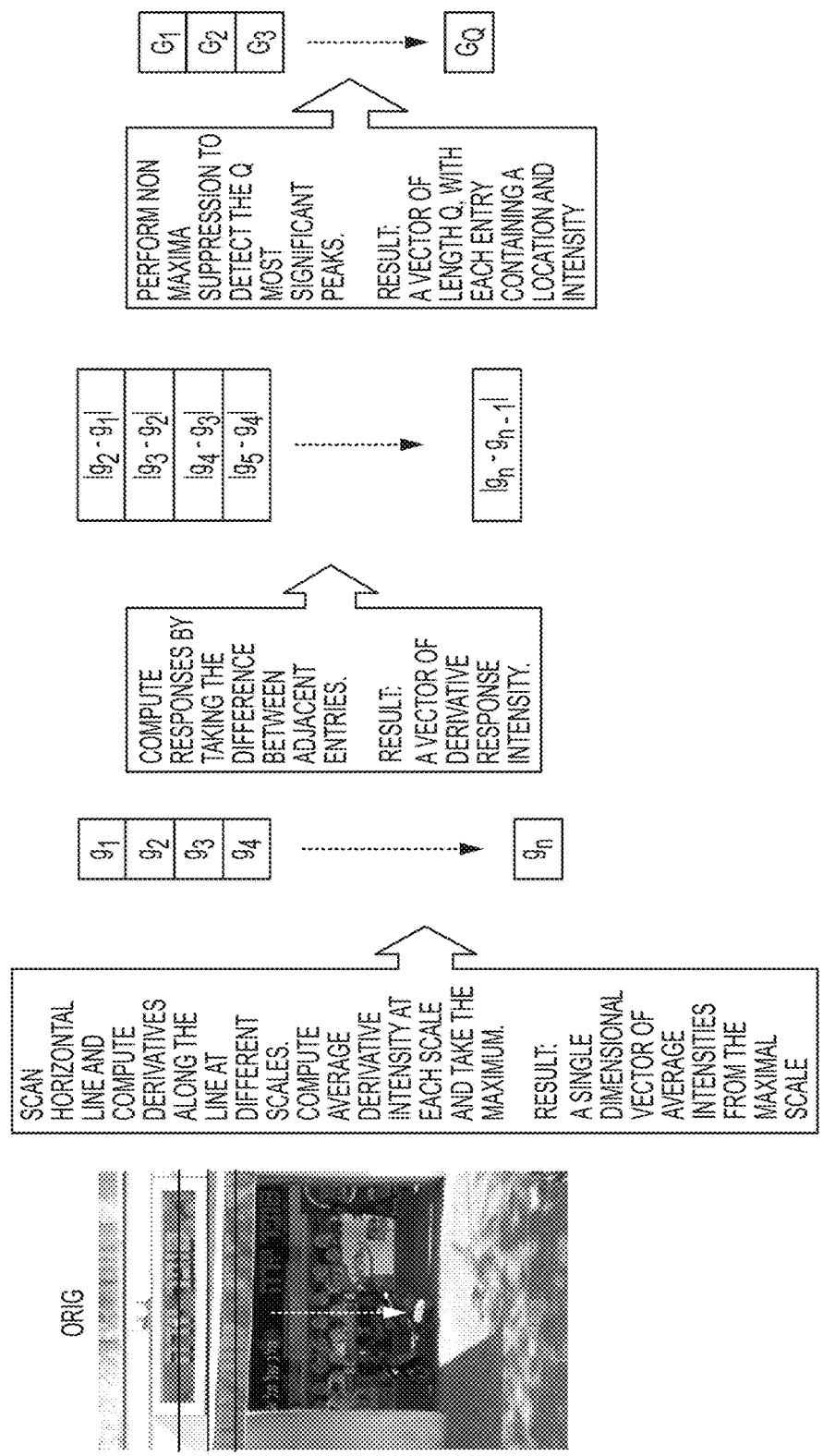
FIG. 4 shows the operation of the gradient density response unit.

FIG. 4 shows the operation of an embodiment of the gradient density unit 104. The process can be utilized to characterize gradient density of an image. The gradient density can be ascertained by scanning horizontal lines of an image 401 and computing derivatives along the lines at different scales. The average derivative intensity at each scale can be computed and maximums determined. This may be accomplished by scanning of horizontal lines and computing derivatives along the lines at different scales of each line. A single-dimensional vector 402 of average intensities from the maximal scale is obtained.

Next, compute responses by taking differences between adjacent entries resulting in a vector 403 of derivative response intensity. Next, perform non-maxima suppression to detect the Q most significant peaks and extract a vector 404 of length Q with each entry containing a location and intensity value.

Figure 5:
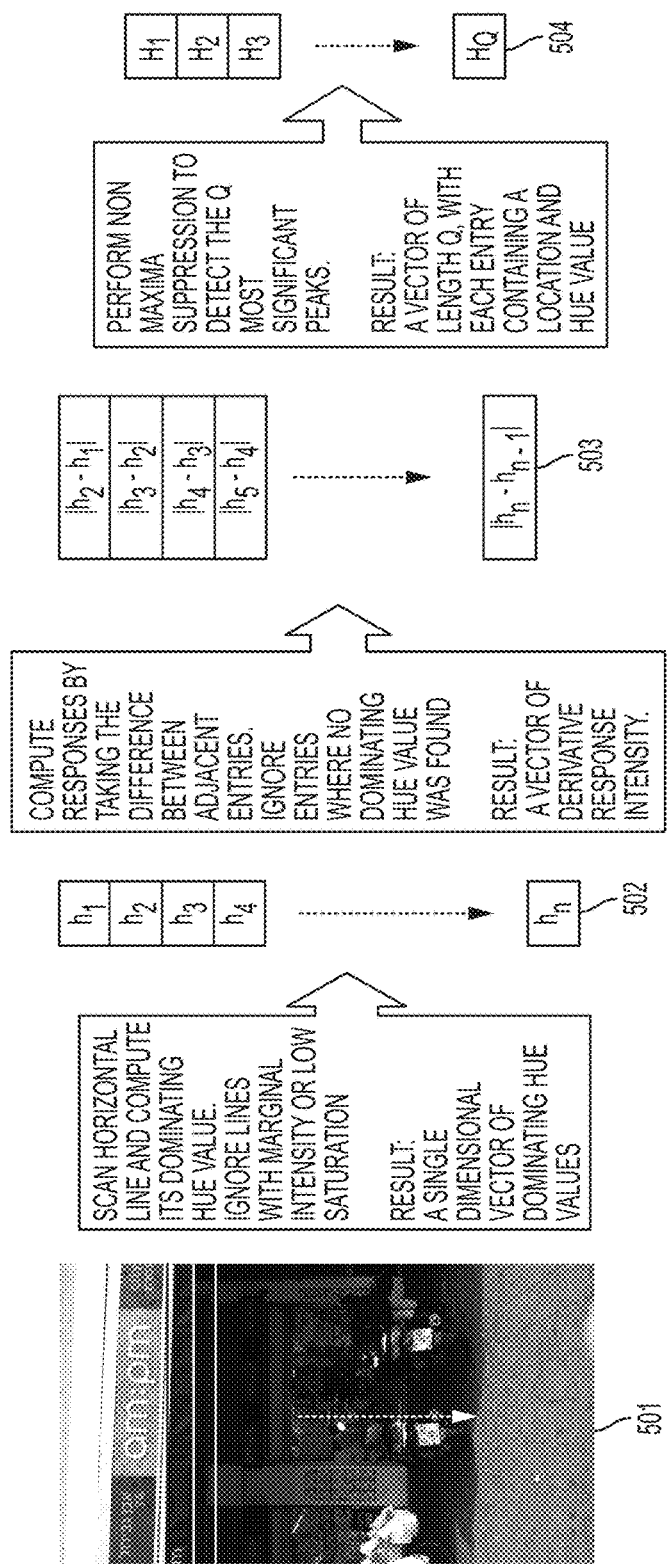
FIG. 5 shows the operation of the gradient dominating hue response unit.

FIG. 5 shows the operation of an embodiment of the dominating hue unit 105 to ascertain the dominating hue of an image. Horizontal lines of a rectified image 501 may be scanned and the dominating hue value for each line can be calculated.

The process may ignore lines with marginal intensity or low saturation. This may be accomplished easily in the HSV color domain identified by a dominating hue below a threshold level.

This results in a single-dimensional vector 502 of dominating hue values for each horizontal line. Next, compute responses by taking the difference between adjacent entries. Entries where no dominating hue value was found may be ignored.

The result is a vector 503 of derivative response intensities. Perform non-maxima suppression to detect the Q most significant peaks, resulting in a vector 504 of length Q with each entry containing a location and hue value.

A signature value may be obtained by a concatenation of the intensity response vector, gradient density vector and dominating hue vector. This can yield a compact abstraction in one embodiment. The size of the signature representative of a point of interest and an abstraction of the image can vary by substantial amounts.

The abstraction may serve as a signature for each point of interest that may be indexed in a database. The abstraction determined by the image capture can be the basis for a randomized consensus search (a tailored RANSAC) for a maximal match score and one-dimensional affine transformation.

The results may be verified by issuing multiple abstraction queries with a confined raster comparison. The queries may take advantage of hysteresis by using a video input rather than a single still image. In view of the computational power, the system can take advantage of a comparison of successive abstractions determined from the captured image. At each RANSAC iteration, a "guess" of a possible transformation may be determined. Every pair of correspondences defines a possible transformation. Two abstractions may be compared simply by comparing matching entries in the vectors. The match scores between abstractions is the number of entries which were matched.

Figure 6:
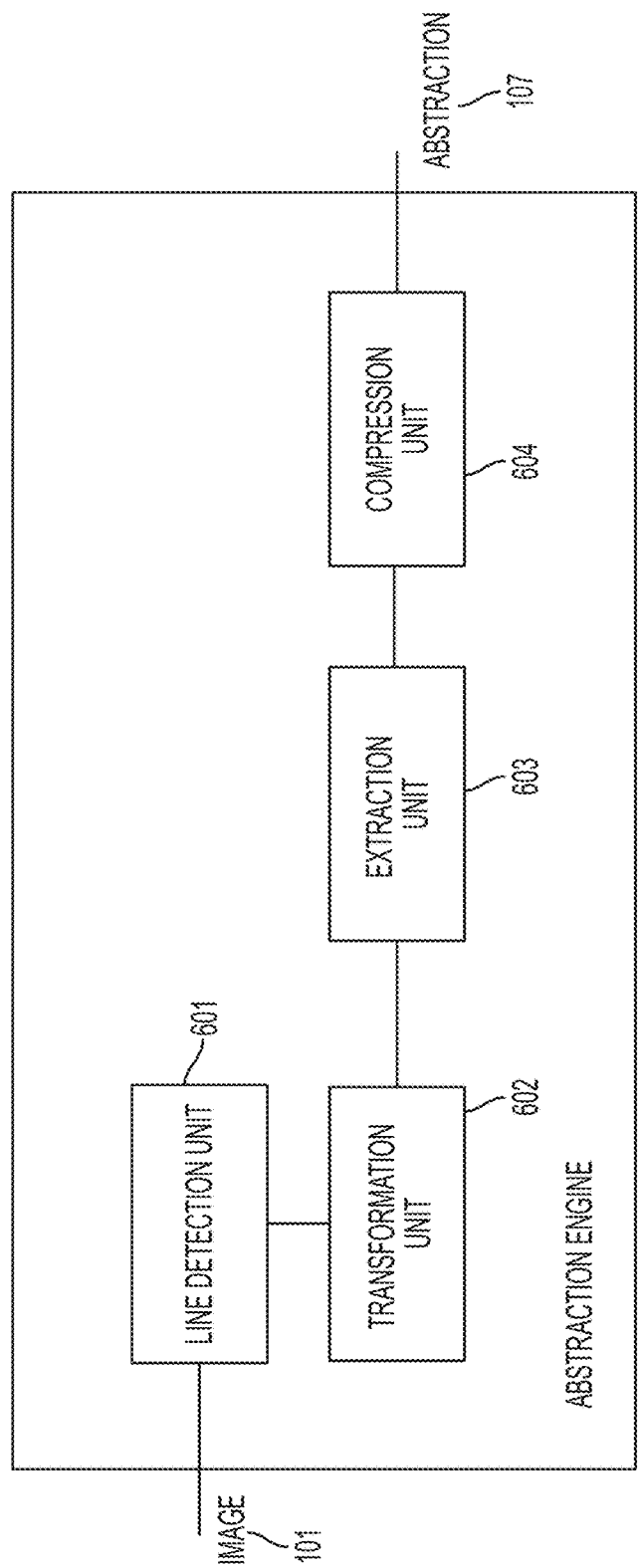
FIG. 6 shows a schematic illustrating an abstraction engine.

FIG. 6 illustrates an abstraction engine embodiment. Image 101 is the input to the abstraction engine. Line detection unit 601 identifies line segments and is connected to a transformation unit 602. The transformation unit may detect points of convergence of lines corresponding to the line segments identified by Line Detection Unit 601. An extraction unit 603 is connected to the transformation unit 602. The extraction unit 603 processes a fronto-parallel representation to extract one or more responses on the basis of variables characteristic of a fronto-parallel view of a pseudo-orthogonal object. Examples of such variables include detection and calculation of an optical characteristic of an image in a scan of horizontal or vertical lines or bands of the image. A compression unit 604 is responsive to the extraction unit to compress the responses determined by the extraction unit 603. The extraction and compression at more than one scale in order to address differences in resolution, angle of view and image size. Multiple scales allows multiple comparisons to increase the likelihood of identifying a match and recognizing a point of interest.

The segmentation process may be performed on a user mobile device. This will consume processor resources on the mobile device. The segmentation may also be performed on a server by a processor or processors having substantially greater computation power and speed. The server processor may be controlled by a web application or a backend server application. Shifting processing to a server enhances the performance of a mobile device by conserving processing resources at the expense of communications resources. In addition, utilizing the mobile device processor facilitates distributed processing amongst many user devices rather than centrally and a limited number of server-based processors. An image 101 is input into a line detection unit 601. The line detection is processed through a transformation unit 602. An extraction unit 603 may be responsive to the transformation unit 602. A compression unit 604 may be responsive to the extraction unit 603 and output an abstraction image 107

Figure 7:
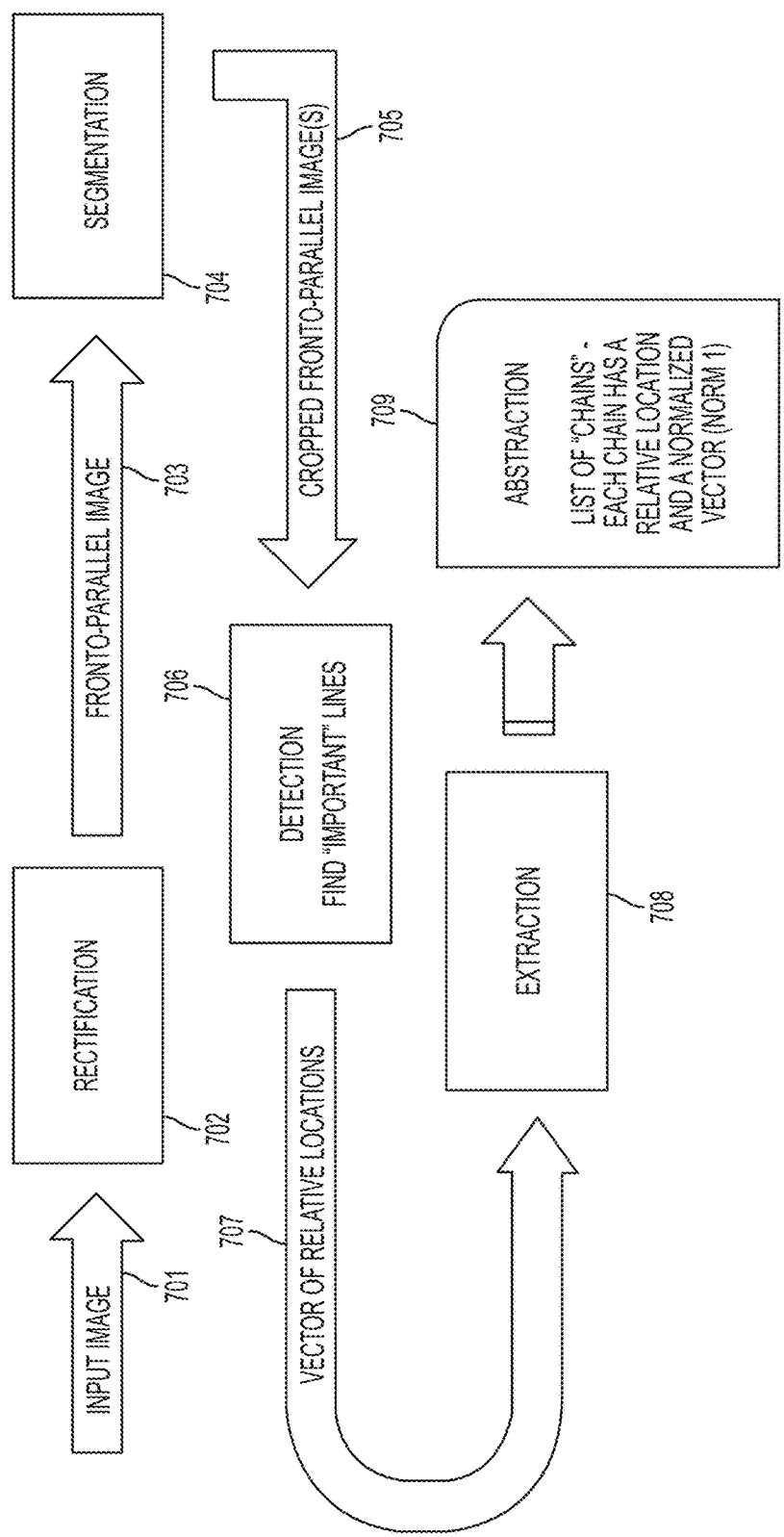
FIG. 7 shows an image abstraction engine system and process.

FIG. 7 shows a process and system for image abstraction. An image to be abstracted is provided as input image 701. Input image 701 may be an image captured by a user seeking to identify or recognize a "point of interest". The input image 701 may also be presented for processing to be included in a reference data base. In this event the image may be indexed against or included metadata describing the subject of the image 701 or other data associated with the input image 701. The input image 701 is processed to standardize its presentation by a transformation to a fronto-parallel image 703. The fronto-parallel image 703 is a normalized rendition of the input image 701, to neutralize variations in images of the same face of an orthogonal object captured from different points of view.

The rectification process 702 may rely on a processor to determine sets of lines having common convergence points. The location of the convergence points may be used to define the transformation applied by the rectification process 702 to achieve the fronto-parallel image 703. An image may exhibit more than one convergence point, each defined by a sufficient number of line segments is characteristic of the input image 701 capturing more than one side of an orthogonal structure. For example, an image of a structure captured from a point of view that is not normal to planar surface of an orthogonal structure, may have captured more than one side of a building. In this case the same image may go through two different transformations in order to yield fronto-parallel representations of two different sides.

The segmentation process 704 is designed to reduce the processing requirements by limiting the characterization to portions of the image which may be of most significance, by limiting the processing to portions of the image that contain orthogonal lines. The segmentation process 704 may be utilized to eliminate background portions of the image and/or eliminate other portions of the image while retaining sufficient area containing orthogonal lines for abstraction. Additionally, segmentation may be utilized to estimate portions of the image which may represent different points of interest. The segmentation may utilize detection of line segment ends in order to recognize lines which might coincide with a boundary representing a particular point of interest. The segmentation process 704 may result in one or more cropped fronto-parallel image segment(s) 705.

The cropped fronto-parallel image segments 705 may undergo a detection process 706. The detection process 706 may operate to find the location of important lines. The locations of important lines is significant insofar as it allows finding lines which have a high probability to remain invariant under different lighting and ambient conditions, and from different angles of view. Also, it allows a substantial reduction in image processing. Rather than processing and analyzing each point of an image or even each line of an image, the processing power required is greatly reduced by first identifying the important lines, and focusing the processing around the important lines. The important lines may be identified by limiting the image data according to one or more channels, obtaining a gradient along horizontal and/or vertical lines of that channel and processing the gradient using a non-maxima suppression as described above.

The detection process 706 results in a vector of relative locations 707 of the important lines in one or more channels. Advantageously the vector of relative locations 707 may be subjected to an extraction process 708. The extraction process 708 characterizes the nature of the change that occurs at each "important line" specified in vector in 707 as identified by the detection process 706. The results of the extraction process 708 may be used to compose an abstraction 709 of a cropped fronto-parallel image segment. The abstraction 709 may be utilized as a reference entry for a point of interest database or as a query.

The rectification 702, segmentation 704, detection 706, and/or extraction 708 and other processes may be performed on a user mobile device or on a server. Processing on the user mobile device consumes processor resources on the mobile device. However, utilizing the mobile device processor facilitates distributing the processing to individual user devices. The segmentation 704 and any of the other processes may be performed on a server by a processor or processors having substantially greater computation power and speed than a user mobile device. Shifting processing to a server enhances the performance of a mobile device by conserving processing resources at the expense of consuming communications resources. The server processor may be controlled by a web application or a backend server application.

Figure 8:
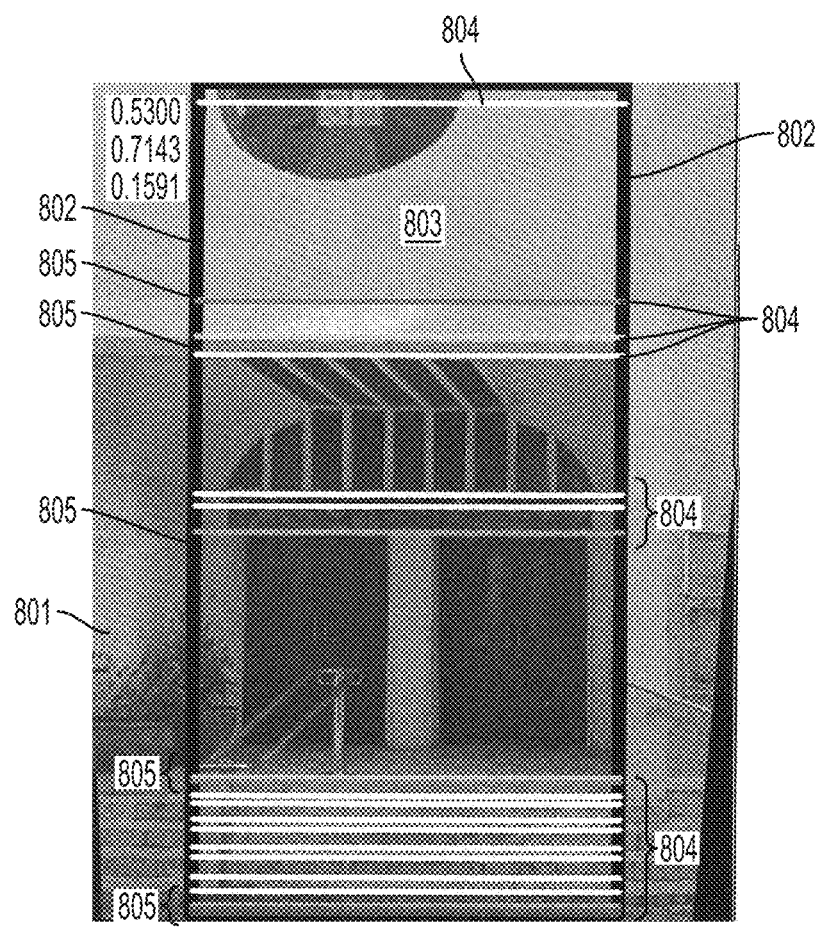
FIG. 8 shows a representative image.

FIG. 8 illustrates an embodiment of a detection process. FIG. 8 represents a fronto-parallel image segment 801. Detected vertical lines 802 are examined to determine if a sufficient number of horizontal line segments 803 terminate at vertical lines 802. If so the image segment 803 is examined for horizontal lines 804. The image segment 803 may be scanned horizontally to determine the average response along lines or bands 804. This may be done in one or more channels. Advantageously the detection process may ignore lines or bands that have a difference in response from an adjacent line or band below a threshold. This further limits the data of interest to the horizontal lines 804 indicated in FIG. 8. Non-maxima suppression can be utilized to further limit the lines of interest to relatively significant or important lines 805. The detection process may identify the location of the important lines 805.

Figure 9:
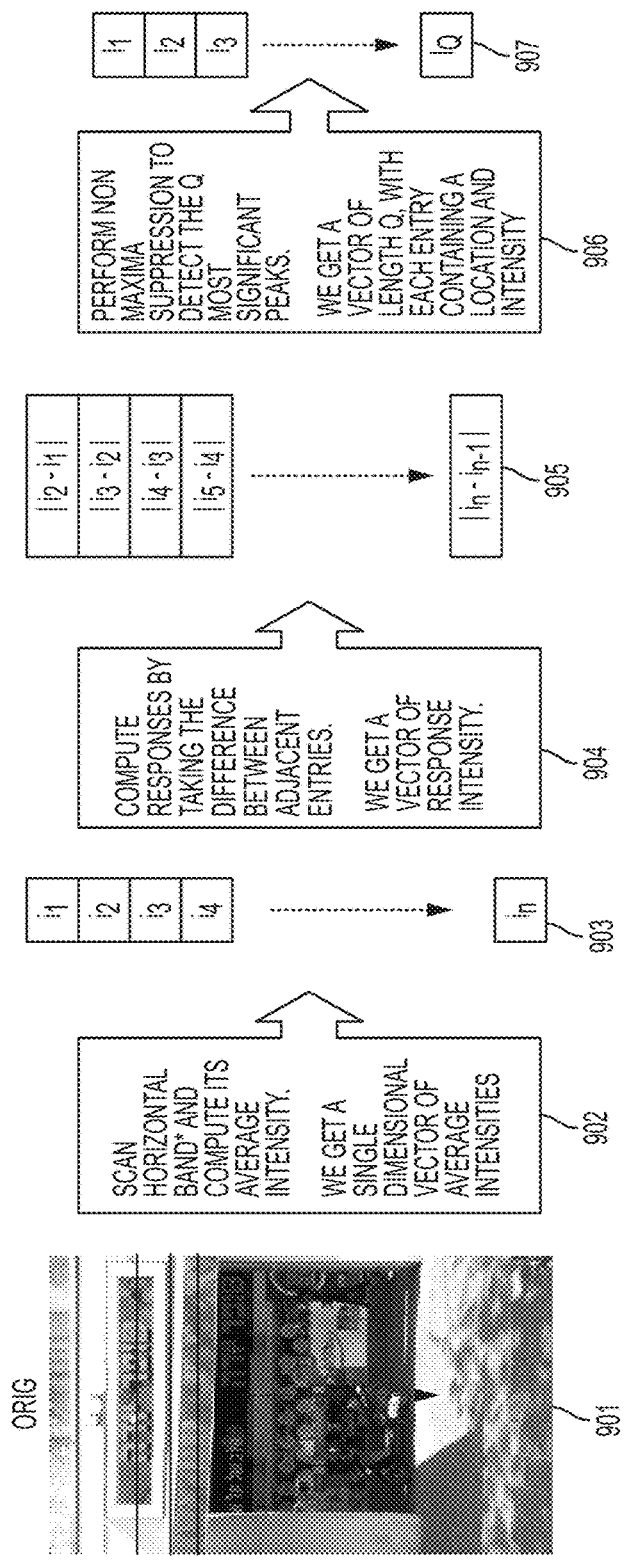
FIG. 9 shows an implementation of the detection process.

FIG. 9 shows an implementation of the detection process 706. The detection process 706 may be for identifying interesting lines or important lines 805. The detection process 706 described may be applied on multiple channels. The detection process 706 may begin with a cropped fronto-parallel image segment 901. The process 902 scans horizontal bands and computes an average intensity in any channel for each band. A band may be a set of adjacent lines which are treated together for the detection purpose. Processing bands may be useful to detect the true statistics of the pixels and be resilient to noise. The average intensity calculation may yield a single-dimensional vector 903. The single dimensional vector 903 may reflect an average intensity for n bands. Step 904 may compute responses by taking the difference between adjacent entries. Process 904 may result in a vector of response intensities 905. Response intensities vector 905 may be processed by a non-maxima suppression process 906 to detect the q most significant peak gradients. This yields a vector 907. Vector 907 may be of a length q which with each entry in the vector 907 containing a location and intensity representing the most important locations.

Figure 10:
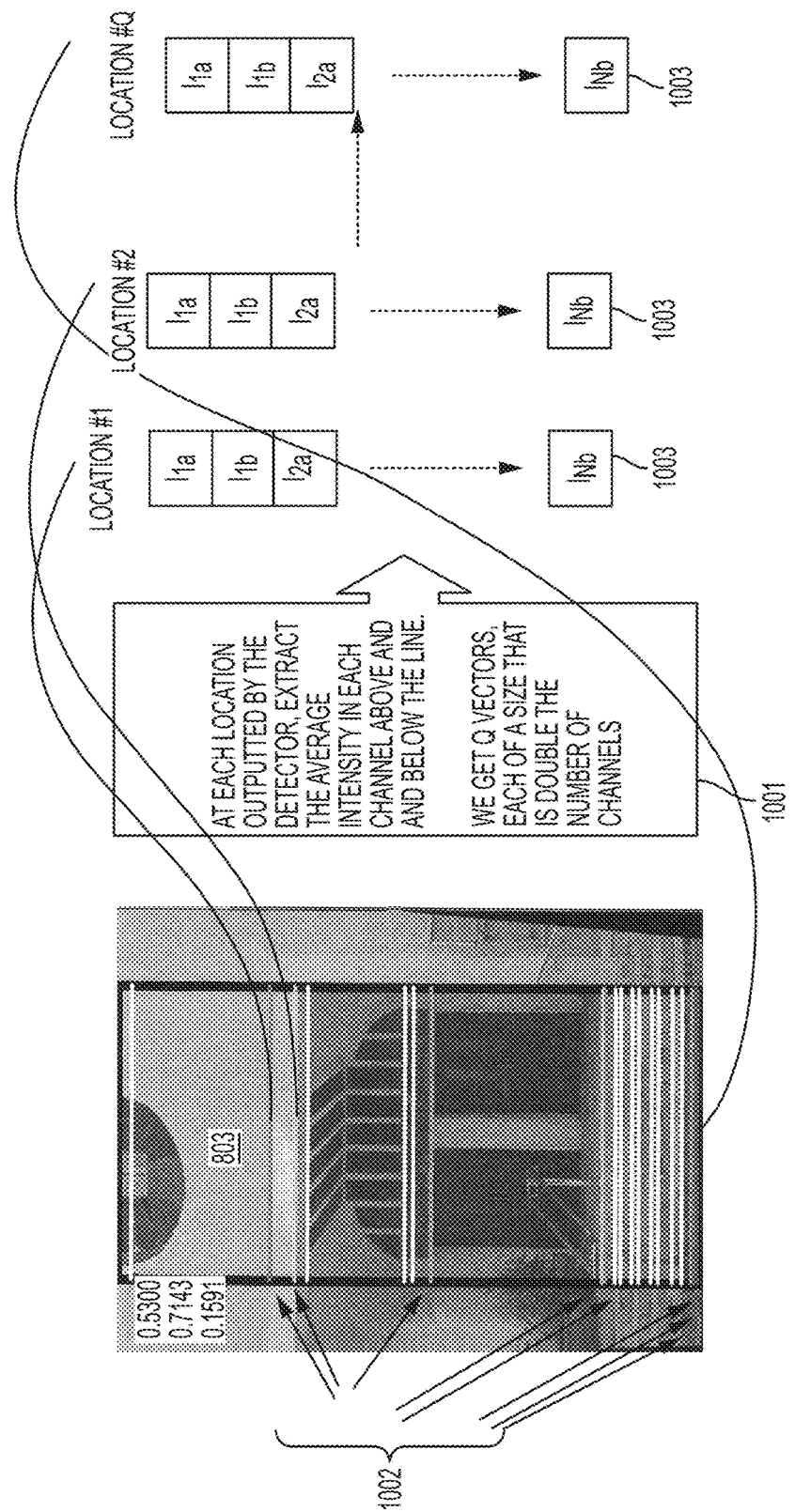
FIG. 10 shows an extraction process.

FIG. 10 illustrates extraction processing according to an embodiment of the invention. The extraction process references image segment 803 and the output of the detection. The extraction process 1001 may extract [extracts] the average intensity in each channel above and below the significant lines 1002 identified in the detection process. For each of the q lines detected, a vector 1003 is obtained which contains a number of entries which is twice the number of channels. Because of the orthogonal nature of the line segments contained within the cropped fronto-parallel image segments, the detection and extraction processes may alternatively or in addition be taken across vertical bands or lines. The vertical processing performed in addition to horizontal processing increases the detail captured by the abstraction.

Adding a process of abstraction by characterizing the nature of the change occurring at the significant lines reduces or eliminates the multi-scale processing. Processing which simply identifies lines and the location of lines requires a greater number of comparisons by scale against a reference database in order to identify matches. Utilizing abstractions which characterize the nature of a line change is able limit the abstraction to a characterization of the change and a sequence of changes, and in most applications, may avoid multi-scale processing.

The invention is described in detail with respect to preferred embodiments, and it will now be apparent from the foregoing to those skilled in the art that changes and modifications may be made without departing from the invention in its broader aspects, and the invention, therefore, as defined in the claims, is intended to cover all such changes and modifications that fall within the true spirit of the invention.

Thus, specific apparatus for and methods of abstraction of images has been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An image abstraction engine comprising:
   an image rectification unit having an input for receiving an input image and an output of a fronto-parallel rendition of a segment of said input image;
   an extraction unit responsive to an output of said image rectification unit where an output of said extraction unit is the characterization of one or more image parameters of said fronto-parallel rendition, and where said one or more image parameters are related to significant features present in an urban scene and based on a scan of said fronto-parallel rendition parallel to at least one orthogonal axis of said fronto-parallel rendition;
   a compression unit having a compression unit input connected to said output of said extraction unit and a compression unit output of compressed image parameters wherein said compression unit output comprises at least a non-maxima suppression output; and
   a scoring unit connected to a database containing a plurality of references indexed against metadata to score an output of said compression unit against said references.

2. The abstraction engine according to claim 1 wherein said one or more image parameters includes intensity response.

3. The abstraction engine according to claim 2 wherein intensity response is determined on a horizontal scan.

4. The abstraction engine according to claim 1 wherein said one or more image parameters includes gradient density.

5. The abstraction engine according to claim 4 wherein gradient density is determined on a horizontal scan.

6. The abstraction engine according to claim 1 wherein said one or more image parameters includes dominating hue.

7. The abstraction engine according to claim 6 wherein dominating hue is determined on a horizontal scan.

8. The abstraction engine according to claim 1 wherein said image rectification unit comprises:
   a line detection unit connected to a said input for receiving an input image and a transformation unit responsive to said line detection unit and an output of said transformation unit is said fronto-parallel rendition of a segment of said input image.

9. The image abstraction engine according to claim 1 wherein said rectification unit further comprises a segmentation unit connected to said input for receiving an input image and an output representing a segment of said input image corresponding to a detected area of interest in said input image.

10. An urban image identification system comprising:
    an image rectification unit having an input for receiving an input image and an output of a fronto-parallel rendition of a segment of said input image;
    an extraction unit responsive to an output of said image rectification unit where an output of said extraction unit is the characterization of at least intensity response, gradient density, and dominating hue of said fronto-parallel rendition based on a scan of said fronto-parallel rendition parallel to at least one orthogonal axis of said fronto-parallel rendition;
    a database containing a plurality of reference image extractions; and
    a scoring unit connected to said database and to an output of said extraction unit to score the relationship of an image processed by said image rectification unit and said extraction unit to a subset of said reference image extractions.

11. The urban image identification system according to claim 10 wherein said scoring unit comprises a RANSAC scoring unit.

12. The urban image identification system according to claim 10 further comprising an image selection unit to provide one or more images captured by a video camera to said image rectification unit input and a score verification unit connected to said scoring unit to compare scores corresponding to said one or more images captured by a video camera.

13. The urban image identification system according to claim 12 wherein said image selection unit provides one or more confined segments of said input image.

14. An image abstraction method comprising the steps of:
transforming an image of an object having a planar face and parallel features wherein the transformation is defined to rectify a portion of said image corresponding to said planar face to a rendition having a point of view normal to said face;
detecting a set of transitions corresponding to lines in said rendition having a point of view normal to said face where said lines are aligned with an axis of an orthogonal reference having an axis parallel to said parallel features;
extracting a characterization of the nature of transitions in said set of transitions wherein said detecting step is performed after said transforming step; and
scoring said characterizations against a plurality of reference characterizations.

15. The image abstraction method according to claim 14 further comprising the step of segmenting said image of said object having a planar face and parallel features by trimming portions of said image of said object having a planar face not corresponding to said planar face.

* * * * *